(12) United States Patent
Dong et al.

(10) Patent No.: US 12,226,761 B2
(45) Date of Patent: Feb. 18, 2025

(54) CATALYST FOR PREPARING PHOSGENE AND PREPARATION METHOD THEREFOR, AND METHOD FOR PREPARATION OF PHOSGENE AND COMPREHENSIVE UTILIZATION OF ENERGY THEREOF

(71) Applicants: WANHUA CHEMICAL (NINGBO) CO., LTD., Ningbo (CN); WANHUA CHEMICAL GROUP CO., LTD., Yantai (CN)

(72) Inventors: Chao Dong, Yantai (CN); Dongke Zhao, Yantai (CN); Yujie Zhou, Yantai (CN); Chaoqun Li, Yantai (CN); Fang Wen, Yantai (CN); Wenbo Wang, Yantai (CN); Hongke Zhang, Yantai (CN); Dan Xu, Yantai (CN); Chong Li, Yantai (CN); Jie Shi, Yantai (CN)

(73) Assignees: WANHUA CHEMICAL (NINGBO) CO., LTD., Ningbo (CN); WANHUA CHEMICAL GROUP CO., LTD, Yantai (CN)

( * ) Notice: Subject to any disclaimer, the term of this patent is extended or adjusted under 35 U.S.C. 154(b) by 622 days.

(21) Appl. No.: 17/623,096

(22) PCT Filed: Sep. 2, 2019

(86) PCT No.: PCT/CN2019/104075
§ 371 (c)(1),
(2) Date: Dec. 27, 2021

(87) PCT Pub. No.: WO2021/035769
PCT Pub. Date: Mar. 4, 2021

(65) Prior Publication Data
US 2022/0266237 A1    Aug. 25, 2022

(30) Foreign Application Priority Data
Aug. 30, 2019   (CN) .......................... 201910813621.4

(51) Int. Cl.
*B01J 37/34* (2006.01)
*B01J 6/00* (2006.01)
(Continued)

(52) U.S. Cl.
CPC ............. *B01J 37/343* (2013.01); *B01J 6/001* (2013.01); *B01J 21/18* (2013.01); *B01J 37/0215* (2013.01); *B01J 37/08* (2013.01); *C01B 32/80* (2017.08)

(58) Field of Classification Search
CPC .......... B01J 21/18; B01J 37/343; B01J 6/001; B01J 37/0215; B01J 37/08; B01J 23/26; B01J 23/14; C01B 32/80
(Continued)

(56) References Cited

U.S. PATENT DOCUMENTS

| 4,231,959 A | 11/1980 | Obrecht |
| 5,110,432 A | 5/1992 | Boateng |

(Continued)

FOREIGN PATENT DOCUMENTS

| CN | 1765740 A | 5/2006 |
| CN | 1829658 A | 9/2006 |

(Continued)

OTHER PUBLICATIONS

English translation of Written Opinion for PCT/CN2019/104075. (Year: 2020).*

(Continued)

*Primary Examiner* — Patricia L. Hailey
(74) *Attorney, Agent, or Firm* — Viksnins Harris Padys Malen LLP

(57) ABSTRACT

Provided in the invention are a catalyst for preparing phosgene and a preparation method therefor, and a method for the preparation of phosgene and the comprehensive utilization of energy thereof. The preparation method comprises the (Continued)

following steps: 1) stirring and soaking activated carbon in a modifying solution, then adding dimethyltin dichloride and chromium oxide powders and carrying out a reaction, and then adding a nickel oxide fine powder and ultrasonically oscillating same to prepare a pre-modified activated carbon; 2) drying the pre-modified activated carbon; and 3) heating and calcinating the dried pre-modified activated carbon from step 2) to prepare the catalyst.

18 Claims, 4 Drawing Sheets

(51) Int. Cl.
  *B01J 21/18* (2006.01)
  *B01J 37/02* (2006.01)
  *B01J 37/08* (2006.01)
  *C01B 32/80* (2017.01)

(58) Field of Classification Search
  USPC ....... 502/180, 182, 208, 210, 213, 242, 256, 502/257; 423/414
  See application file for complete search history.

(56) References Cited

U.S. PATENT DOCUMENTS

| | | | |
|---|---|---|---|
| 2002/0141923 | A1 | 10/2002 | Kittrell et al. |
| 2005/0025693 | A1 | 2/2005 | Bagala et al. |
| 2006/0047170 | A1 | 3/2006 | Keggenhoff et al. |
| 2011/0184209 | A1 | 7/2011 | Ohno et al. |
| 2016/0137511 | A1 | 5/2016 | Chen et al. |
| 2016/0347701 | A1 | 12/2016 | Gautam et al. |
| 2017/0001943 | A1 | 1/2017 | Gautam et al. |

FOREIGN PATENT DOCUMENTS

| | | | | |
|---|---|---|---|---|
| CN | 102089242 | A | 6/2011 | |
| CN | 102164849 | A | 8/2011 | |
| CN | 102171138 | A | 8/2011 | |
| CN | 104415770 | A | 3/2015 | |
| CN | 104437578 | A | 3/2015 | |
| CN | 105439563 | A | 3/2016 | |
| CN | 105960389 | A | 9/2016 | |
| CN | 105980346 | A | 9/2016 | |
| CN | 106634997 | A | 5/2017 | |
| CN | 107275722 | A | 10/2017 | |
| CN | 110152648 | A | 8/2019 | |
| EP | 1640341 | A2 | 3/2006 | |
| JP | H10120410 | A | 5/1998 | |
| WO | WO-9800364 | A1 * | 1/1998 | ............ B01J 27/224 |

OTHER PUBLICATIONS

European Search Report, for EP Application No. 19942869.9, 7 pages, dated Jun. 21, 2023.
Chinese Office Action, for CN Application No. 201910813621.4, 9 pages, dated Mar. 26, 2021.
Gupta, N, et al., "Bent Carbon Surface Moieties as Active Sites on Carbon Catalysts for Phosgene Synthesis", Angew Chem 128, 1760-1764 (2016).
Patent Cooperation Treaty, International Searching Authority, Search Report for PCT/CN2019/104075, 8 pages, dated May 22, 2020.
Pan, Y., et al., "Effects of Additives in H3PO4 Solution on Properties of Activated Carbon from Walnut Shell", Biomass Chemical Engineering 53(1), 40-46 (2019). [English Abstract].
Tan, Y., et al., "Advances in research of silicate/phosphate composite bone cement", Chin J Clinicians (Electronic Edition) 11(13), 1993-1996 (2017). [English Abstract].

* cited by examiner

CATALYST FOR PREPARING PHOSGENE AND PREPARATION METHOD THEREFOR, AND METHOD FOR PREPARATION OF PHOSGENE AND COMPREHENSIVE UTILIZATION OF ENERGY THEREOF

CROSS-REFERENCE TO RELATED APPLICATION(S)

This patent application is a 35 U.S.C. § 371 application of International Application Number PCT/CN2019/104075, filed Sep. 2, 2019; and claims the benefit of priority of Chinese Patent Application No. 201910813621.4 filed on Aug. 30, 2019.

TECHNICAL FIELD

The present disclosure belongs to the field of phosgene synthesis and, in particular, relates to a catalyst for preparing phosgene and a technique for phosgene synthesis and comprehensive utilization of energy.

BACKGROUND

Phosgene whose scientific name is carbonyl chloride smells of rotten apple. Pure phosgene is colorless and the industrial products of phosgene are light yellow or light green. Phosgene has very active chemical properties due to two acyl chlorides. As a very important chemical raw material, phosgene is widely used in organic synthesis and widely applied to the synthesis of pesticides, dyes, coatings, initiators, medicines, fine chemicals, isocyanates (R—NCO), diphenylmethane diisocyanate (MDI), toluene diisocyanate (TDI), polyurethane (PU) and the like. With the vigorous development of MDI, TDI, PU and special fine phosgene chemicals on the market in recent years, the demand for phosgene, which is a main raw material, has also grown rapidly. Therefore, it is particularly important to study the output and quality of phosgene and the comprehensive utilization of energy.

Phosgene is mainly produced in industries by the following method: phosgene is synthesized with carbon monoxide and chlorine gas as raw materials and activated carbon as a catalyst. Commonly used activated carbon includes coconut shell activated carbon and coal-based activated carbon. The synthesis reaction of phosgene is a strongly exothermic reaction, and the unit heat of reaction of chlorine gas is 116 kJ/mol. For such exothermic reactions, whether the heat of reaction can be removed in time is very critical. If the heat of reaction cannot be removed in time, a "temperature runaway" is caused and an adiabatic temperature rise can reach more than 550° C., which will increase a reaction speed and cause severe ablation and pulverization of activated carbon. A vicious circle may even cause the reaction to run out of control. Just for the synthesis reaction of phosgene, phosgene will decompose into carbon monoxide and chlorine gas at a high temperature at a rate of greater than 80%. Excessive chlorine gas will cause free chlorine at the outlet of a phosgene synthesis reactor to exceed a standard, which seriously affects the quality of phosgene. In a phosgenation reaction environment, excessive chlorine gas will react with amine into chlorine-containing compounds. These chlorine-containing impurity compounds are difficult to remove by conventional methods such as rectification and recrystallization, which seriously affect product quality. In addition, due to different degrees of thermal expansion of the reactor and a shell, an increased temperature difference between the reactor and the shell causes the device to be damaged. For example, a steel device is further damaged due to a reaction of chlorine with iron at a high temperature.

At present, a phosgene synthesis reactor is mainly a vertical tubular fixed bed reactor with activated carbon as a catalyst in a tube side and a cooling medium in a shell side. The cooling medium is mainly water with a low boiling point, an organic solvent or a hot oil with a high boiling point. Chlorine gas and carbon monoxide are mixed in advance in a mixer and enter the reactor from the bottom. The cooling medium takes heat away uniformly in the form of parallel flow or counter flow. People in the industry have made many attempts to improve a phosgene synthesis method to improve the economy of the method and the quality of phosgene.

EP1135329B1 has disclosed a method for producing low-carbon tetrachloride phosgene. Carbon monoxide with a low content of methane is used as a raw material for reducing the amount of carbon tetrachloride generated through the reaction of methane with chlorine gas, so as to reduce an effect of carbon tetrachloride on the quality of the subsequent product. In fact, the content of methane in the raw material carbon monoxide is extremely low, and a large amount of carbon tetrachloride is produced through the reaction of chlorine gas with activated carbon at a high temperature.

U.S. Pat. No. 4,231,959 has disclosed a method for preparing phosgene, which reduces the content of residual chlorine in phosgene by increasing an excess rate of carbon monoxide and improves product quality. It has been mentioned that in addition to water, boiling water may also be used as a cooling medium on the shell side of the reactor and usable steam is generated in this case. However, the steam is low in quality and low economy is achieved. Moreover, water is used as a heat exchange medium so that when the device is corroded due to the gradually increased high temperature, water leaks into the reaction space to react with phosgene, further aggravating corrosion and posing a high safety risk.

CN109289714A has disclosed a method for filling a catalyst for a phosgene synthesis reaction.

The upper and lower layers of an activated carbon bed are filled with large ceramic balls of 100 mm to 300 mm and covered with 1 or 2 layers of screens to reduce the loss of activated carbon. However, such a traditional filling method cannot reduce a reaction rate and a heat release rate and prevent the temperature runaway, with still serious pulverization and ablation of activated carbon.

CN1765740A has disclosed a method and a device for producing phosgene. Chlorine gas and carbon monoxide are reacted in a shell-and-tube reactor. The reactor has many reaction tubes and a coolant space surrounding the reactor. A coolant is evaporated for steam generation. However, only a reactor device for steam generation is introduced in this application, the hot spot temperature of a phosgene synthesis reactor has not been improved, an outlet temperature of a reactor for steam generation is higher, and the catalyst activated carbon has a shorter service life.

At present, people in the industry have mainly conducted relatively many researches and improvements on the economy and product quality of phosgene synthesis. There are few reports on improving the life cycle of the phosgene synthesis reactor, reducing operating costs, and comprehensive utilization of energy. The current technique for phosgene synthesis has a prominent problem: activated carbon has poor high temperature resistance and oxidation resistance, the reactor has a relatively large radial temperature difference, the hot spot temperature at the center of the catalyst cannot be quickly removed, and activated carbon is ablated and pulverized at a high temperature and reacts with the raw material chlorine gas and trace oxygen in the raw material gas into carbon tetrachloride or carbon dioxide, causing serious loss of activated carbon; and the raw material gas contains oxygen of 100-300 mg/Nm$^3$, which further accelerates the ablation and pulverization of activated carbon, the reactor has a shorter life cycle of the reactor, and the device has poor operating stability. In addition, carbon tetrachloride in phosgene cannot be separated effectively, reducing the quality of a downstream product.

A large amount of waste brine is generated during the production of diphenylmethane diisocyanate/polyphenylmethane polyisocyanate. Most of the waste brine is directly discharged into the sea after organic matters are removed in the industry, resulting in a waste of salt resources.

SUMMARY

In view of this, the present disclosure provides a preparation method of a catalyst for preparing phosgene. The preparation method can improve high temperature resistance and oxidation resistance of activated carbon, a service life of the catalyst, and a safe and stable operation of a device. The present disclosure further provides a method for phosgene preparation and comprehensive utilization of energy. In a phosgene preparation technique, the catalyst of the present disclosure guarantees a longer operating cycle so that the repeated shutdowns for replacing the catalyst can be prevented in a phosgene production process and steam can be stably generated; phosgene production is coupled with a brine evaporation and concentration technique, heat of reaction from the phosgene production is used as a heat source to obtain steam, and the steam is used as a heat source for brine evaporation and concentration, which not only avoids energy waste but also avoids resource waste caused by the discharge of waste brine, and achieves the purpose of integrating the comprehensive utilization of energy.

To achieve the preceding object, the present disclosure adopts technical solutions described below.

In an aspect, the present disclosure provides a preparation method of a catalyst for preparing phosgene. The preparation method includes the following steps:

(1) soaking activated carbon in a modified solution with stirring (for example, at a uniform speed), then adding (for example, slowly) dimethyltin dichloride and chromium oxide powder to the modified solution for reaction, and adding heat-treated nickel oxide fine powder and performing ultrasonic oscillation to obtain pre-modified activated carbon, wherein the modified solution is a mixed acid solution including phosphoric acid and silicic acid;

(2) drying the pre-modified activated carbon obtained in step (1); and (3) under the protection of an inert gas (for example, nitrogen, argon and other common inert gases in the art), heating and calcining (for example, in a high temperature furnace) the pre-modified activated carbon dried in step (2) to obtain the catalyst.

The modified activated carbon catalyst is prepared by the preparation method of the present disclosure: the dimethyltin dichloride powder and the chromium oxide powder are added into the mixed acid solution of phosphoric acid and silicic acid and fully reacted so that chromium tin phosphate and chromium tin silicate are prepared, nickel oxide has relatively high activity after heat treatment and reacts with chromium tin phosphate and chromium tin silicate in the solution to form —O—Ni—O— chain bridges, chromium tin phosphate and chromium tin silicate are bonded laterally and longitudinally through the chain bridges and extend continuously to form a spatial network structure, and finally a dense polymerized thin layer is formed on a surface of the activated carbon. Therefore, the modified activated carbon catalyst obtained by the preparation method of the present disclosure includes the polymerized thin layer covering the surface of the activated carbon, where the polymerized thin layer is formed by chromium tin phosphate and chromium tin silicate laterally and longitudinally bonded through the —O—Ni—O— chain bridges. The polymerized thin layer greatly enhances the high temperature resistance and oxidation resistance of activated carbon, and the obtained catalyst has the characteristics of high mechanical strength, resistance to pulverization, high temperature resistance and strong oxidation resistance.

In some embodiments, the modified solution in step (1) is obtained in a manner that phosphoric acid is stirred and dissolved in water (for example, pure water) to obtain a phosphoric acid solution and then silicic acid is (for example, slowly) added to the phosphoric acid solution and stirred uniformly. The phosphoric acid solution is prepared and then silicic acid is added to prepare the modified solution, which can achieve a better mixing effect. In some embodiments, the phosphoric acid solution has a mass concentration of 5% to 20% (for example, 5%, 7%, 10%, 13%, 15%, 18% or 20%), preferably 7% to 18%, more preferably 10% to 15%. In some embodiments, a mass ratio of silicic acid to phosphoric acid is 1:1 to 1:5 (for example, 1:1, 1:2, 1:2.5, 1:3, 1:3.5, 1:4 or 1:5), preferably 1:2 to 1:3.5.

In some embodiments, the activated carbon in step (1) is selected from wooden activated carbon and/or coconut shell activated carbon and has a particle size of 2 mm to 7 mm (for example, 2 mm, 3 mm, 4 mm, 5 mm or 7 mm), preferably 3 mm to 5 mm.

In some embodiments, in step (1), a mass ratio of the activated carbon to the modified solution is 1:0.6 to 1:2 (for example, 1:0.6, 1:0.8, 1:1, 1:1.2, 1:1.5, 1:1.8 or 1:2), preferably, 1:0.8 to 1:1.5; and the activated carbon is soaked in the modified solution for 5 h to 20 h (for example, 5 h, 10 h, 13 h, 15 h, 18 h or 20 h), preferably 10 h to 15 h. In some embodiments, in step (1), the activated carbon is stirred at a rate of 20 r/min to 50 r/min, preferably 30 r/min to 40 r/min.

In some embodiments, in step (1), dimethyltin dichloride is added in an amount of 0.2-2.0 mol/L (for example, 0.2 mol/L, 0.3 mol/L, 0.5 mol/L, 0.7 mol/L, 1.0 mol/L, 1.3 mol/L, 1.5 mol/L or 2.0 mol/L), preferably 0.3-1.5 mol/L, more preferably 0.5-1.0 mol/L; in step (1), chromium oxide is added in an amount of 0.2-3.0 mol/L (0.2 mol/L, 0.3 mol/L, 0.5 mol/L, 0.8 mol/L, 1.0 mol/L, 1.3 mol/L, 1.5 mol/L, 2.0 mol/L, 2.5 mol/L or 3.0 mol/L), preferably 0.5-2.0 mol/L, more preferably 0.8-1.5 mol/L; and in step (1), a reaction time for adding the dimethyltin dichloride powder and chromium oxide powder for the reaction is 1-5 h (1 h, 2 h, 3 h, 4 h or 5 h), preferably 2-3 h.

In some embodiments, in step (1), the nickel oxide fine powder is heat-treated at a temperature of 400-600° C. (for example, 400° C., 450° C., 500° C., 550° C. or 600° C.), preferably 450-550° C., which can improve the adhesion of loads on the surface of the activated carbon and the mechanical strength of the activated carbon; and the nickel oxide fine powder is heat-treated for 1-4 h (for example, 1 h, 2 h, 3 h or 4 h), preferably 2-3 h.

In some embodiments, in step (1), the nickel oxide fine powder has a particle size of 0.3-1.5 μm (for example, 0.3

μm, 0.5 μm, 0.6 μm, 0.8 μm, 1.0 μm, 1.2 μm or 1.5 μm), preferably, 0.5-0.8 μm; and the nickel oxide fine powder is added in an amount of 0.2-1.5 mol/L (0.2 mol/L, 1.5 mol/L, 0.4 mol/L, 0.6 mol/L, 0.8 mol/L, 1.0 mol/L, 1.2 mol/L or 1.5 mol/L), preferably 0.6-1.2 mol/L; in step (1), the added nickel oxide fine powder is reacted for 1-5 h (1 h, 2 h, 3 h, 4 h or 5 h), preferably, 2-3 h; and the ultrasonic oscillation is conducted for the same time as the added nickel oxide fine powder is reacted.

In some embodiments, in step (1), the ultrasonic oscillation is conducted using an ultrasonic pulse with a frequency of 10-30 kHz (for example, 10 kHz, 12 kHz, 15 kHz, 17 kHz, 20 kHz or 30 kHz), preferably 12-25 kHz, more preferably 15-20 kHz and a width of 50-500 ms (for example, 50 ms, 70 ms, 100 ms, 150 ms, 200 ms, 250 ms, 300 ms, 350 ms, 400 ms, 450 ms or 500 ms), preferably 100-450 ms, more preferably 150-300 ms. The ultrasonic oscillation conducted under preferred conditions can better cure chemical modification. As described above, the ultrasonic oscillation is conducted for the same time as the added nickel oxide fine powder is reacted, preferably 1-5 h (1 h, 2 h, 3 h, 4 h or 5 h). In some embodiments, in step (2), the pre-modified activated carbon is dried at a temperature of 150-200° C. (for example, 150° C., 170° C. or 200° C.) for 4 h to 8 h (for example, 4 h, 6 h, 7 h or 8 h).

In some embodiments, in step (3), the pre-modified activated carbon is heated and calcined at a temperature of 500° C. to 800° C. (for example, 500° C., 550° C., 600° C., 650° C., 700° C. or 800° C.), preferably 600° C. to 700° C. for 5 h to 15 h (for example, 5 h, 8 h, 10 h, 12 h or 15 h), preferably 8 h to 12 h.

Operations (soaking, reaction, ultrasonic oscillation and so on) involved in step (1) only need to be conducted at an ambient temperature (or room temperature) without intervening in the control of a system temperature (for example, without additional intervention such as heating), for example, step (1) is performed at an ambient temperature of 10-40° C. (Specifically, for example, in Examples 1 to 4 below, all parts involving step (1) are implemented at an ambient temperature of 25-30° C., which is not repeated in Examples 1 to 4 below).

The catalyst prepared by the preparation method of the present disclosure includes the polymerized thin layer covering its surface, where the polymerized thin layer is formed by chromium tin phosphate and chromium tin silicate laterally and longitudinally bonded to Ni through the —O—Ni—O— chain bridges. In conjunction with ultrasonic cavitation, the polymerized thin layer promotes and cures the chemical modification of the activated carbon and greatly enhances the high temperature resistance and oxidation resistance of the activated carbon, and the obtained catalyst has the characteristics of high mechanical strength, resistance to pulverization, high temperature resistance and strong oxidation resistance.

In an aspect, the present disclosure further provides a catalyst for preparing phosgene. The catalyst uses activated carbon as a carrier, where a thin layer is formed on a surface of the activated carbon by chromium tin phosphate and chromium tin silicate bonded to Ni through —O—Ni—O— chain bridges. Specifically, a polymerized thin layer formed by chromium tin phosphate and chromium tin silicate laterally and longitudinally bonded through the —O—Ni—O— chain bridges covers the surface of the carrier activated carbon. The catalyst may be prepared by the preceding preparation method.

In an aspect, the present disclosure further provides a use of the preceding catalyst for catalyzing a reaction of carbon monoxide with chlorine gas to prepare phosgene. Preferably, a total oxygen content in the raw material chlorine gas and the raw material carbon monoxide is controlled to be 10-50 mg/Nm$^3$ (for example, 10 mg/Nm$^3$, 15 mg/Nm$^3$, 20 mg/Nm$^3$, 25 mg/Nm$^3$, 40 mg/Nm$^3$ or 50 mg/Nm$^3$), preferably 10-20 mg/Nm$^3$. Trace oxygen in the raw materials chlorine gas and carbon monoxide reacts with activated carbon at a high temperature into carbon dioxide, causing a loss of the activated carbon due to heat at the high temperature, reducing a height of a bed layer in a reactor, and shortening a service life, and unstable heat of reaction affects the quality of steam and the operating stability performance of a device. Inventors have found that the total oxygen content in the raw materials chlorine gas and carbon monoxide is preferably controlled to be 10-50 mg/Nm$^3$, more preferably 10-20 mg/Nm$^3$, which can effectively remedy the above defects, help extend the service life of the catalyst, obtain stable heat of reaction, and thus improve the quality of steam and the operating stability of the device.

The catalyst obtained by the preparation method of the present disclosure is used for preparing phosgene. The catalyst is an activated carbon catalyst whose surface is covered with a polymerized thin layer formed by chromium tin phosphate and chromium tin silicate laterally and longitudinally bonded to Ni through —O—Ni—O— chain bridges and which is modified and cured by ultrasonic waves and has improved high temperature resistance and oxidation resistance. In a preferred solution, chlorine gas and carbon monoxide with an oxygen content of 10-20 mg/Nm$^3$ are reacted for preparing phosgene, which can greatly reduce a reaction rate of the catalyst with the raw material chlorine gas and trace oxygen in the raw material gas, significantly alleviate or eliminate the ablation or pulverization of the activated carbon at the high temperature, and improve the service life of the catalyst.

In another aspect, the present disclosure further provides a method for phosgene preparation and comprehensive utilization of energy, including the following steps:

chlorine and carbon monoxide are mixed, enter a phosgene synthesis reactor filled with a catalyst prepared by the preceding preparation method or the preceding catalyst, and are reacted under the action of the catalyst to synthesize phosgene; where a reaction pressure in the phosgene synthesis reactor may be 0.1-0.5 MPaG, preferably 0.2-0.4 MPaG; an inlet temperature (the temperature of CO and chlorine gas entering the reactor after mixed) of the phosgene synthesis reactor may be controlled to be 10-60° C., preferably 20-40° C.; and a total oxygen content in the raw material chlorine gas and the raw material carbon monoxide is preferably controlled to be 10-50 mg/Nm$^3$ (10 mg/Nm$^3$, 15 mg/Nm$^3$, 20 mg/Nm$^3$, 25 mg/Nm$^3$, 40 mg/Nm$^3$ or 50 mg/Nm$^3$), more preferably 10-20 mg/Nm$^3$;

the phosgene synthesis reactor is provided with a coolant circulation space (for example, a shell side of the phosgene synthesis reactor and specifically a space surrounding tubes in the phosgene synthesis reactor), where a coolant circulating in the coolant circulation space is used for absorbing heat of reaction generated during synthesis of the phosgene; the coolant in the coolant circulation space absorbs the heat of reaction, is introduced into a steam generator, and exchanges heat with water to be converted into steam so that the steam is generated; and the coolant that has exchanged heat with the water to be converted into the steam is returned to the coolant circulation space in the phosgene synthesis reactor for absorbing the heat of reaction generated during the synthesis of the phosgene; and the steam is supplied to a brine evaporation and concentration unit for evaporating and concentrating brine as a heat source required for evaporation and concentration of the brine.

In some preferred embodiments, concentrated brine obtained through the evaporation and concentration of the brine evaporation and concentration unit is sent to a chloralkali electrolysis cell and electrolyzed so that the chlorine gas is obtained.

In the method for phosgene preparation and comprehensive utilization of energy provided in the present disclosure, the catalyst obtained by the method of the present disclosure is an activated carbon catalyst whose surface is formed with a polymerized thin layer formed by chromium tin phosphate and chromium tin silicate laterally and longitudinally bonded to Ni through —O—Ni—O— chain bridges and which is modified and cured by ultrasonic waves, which improves the high temperature resistance and oxidation resistance of activated carbon. In a preferred solution, chlorine gas and carbon monoxide with an oxygen content of preferably 10-20 mg/Nm$^3$ are used at the same time, which greatly reduces a reaction rate of the catalyst with the raw material chlorine gas and trace oxygen in the raw material gas, significantly alleviates or eliminates the ablation or pulverization of the activated carbon at a high temperature, and improves the service life of the catalyst. Meanwhile, high-quality phosgene with low free chlorine and low carbon tetrachloride is produced; a phosgene preparation technique is coupled with a steam generation device and a brine evaporation and concentration technique to improve the safe and stable operation of a phosgene production device so that the steam can be stably produced as a by-product along with producing the phosgene; the by-product steam is used as the heat source for evaporating the brine (such as waste brine generation in a production process of diphenylmethane diamine/polyphenylmethane polyamine or diphenylmethane diisocyanate/polyphenylmethane polyisocyanate), and the concentrated brine may be sent to the chloralkali electrolysis cell and electrolyzed so that chlorine gas is produced, integrating the comprehensive utilization of energy.

The coolant may be one or at least two of chlorobenzene, o-dichlorobenzene, carbon tetrachloride, decalin or an alkylbenzene type heat transfer oil, preferably one or at least two of o-dichlorobenzene, xylene, carbon tetrachloride or decalin, further preferably o-dichlorobenzene and/or decalin, more preferably decalin.

In some embodiments, the phosgene generated in the phosgene synthesis reactor is sent to a phosgene synthesis protector which is a well-known device to those skilled in the art. The phosgene synthesis protector is packed with the preceding catalyst (that is, the catalyst filled in the phosgene synthesis reactor), where a reaction pressure in the phosgene synthesis protector may be 0.1-0.5 MPaG, preferably 0.2-0.4 MPaG; the unreacted chlorine gas and carbon monoxide are further reacted. Preferably, an outlet temperature of the phosgene synthesis protector is controlled to be lower than 100° C.; preferably, the outlet temperature is controlled to be 50° C. to 80° C., more preferably 60° C. to 70° C. The outlet temperature of the phosgene synthesis protector is controlled to be the preceding preferred temperature, which can effectively prevent the phosgene from decomposing into CO and chlorine gas and is conducive to making a content of free chlorine in phosgene outputted from an outlet of the phosgene synthesis protector lower than 50 mg/Nm$^3$.

In some embodiments, the steam generated in the steam generator has a pressure within a range of 0.2-1.6 MPaG (for example, 0.2 MPaG, 0.5 MPaG, 1.0 MPaG, 1.3 MPaG or 1.6 MPaG), Preferably, the steam is high-quality steam with a pressure of 1.0-1.6 MPaG.

In some embodiments, the brine to be evaporated and concentrated in the brine evaporation and concentration unit is from the waste brine produced in the production process of diphenylmethane diamine, polyphenylmethane polyamine, diphenylmethane diisocyanate or polyphenylmethane polyisocyanate; preferably, sodium chloride in the brine has a mass concentration of 5% to 23% and TOC (short for total organic carbon) in the brine has a content of 2-15 ppm, which is conducive to increasing the operation and economic benefits of the brine evaporation and concentration unit and prolonging the service life of an ion membrane of an electrolysis unit.

In some embodiments, the brine evaporation and concentration unit adopts double-effect or multi-effect evaporation well-known to those skilled in the art, preferably double-effect or triple-effect evaporation; and a concentration of sodium chloride in the concentrated brine obtained through the evaporation and concentration of the brine evaporation and concentration unit is controlled to be 300 g/L to 310 g/L, and the concentrated brine may be directly sent to the chloralkali electrolysis cell and electrolyzed so that chlorine gas is produced.

In some embodiments, the phosgene synthesis reactor is a tubular reaction tube, a spiral tube reactor, a tubular fixed bed reactor or a double-tube plate-type fixed bed reactor, preferably the tubular fixed bed reactor widely used in the art. Specifically, in the phosgene synthesis reactor, the catalyst is filled in tubes and the coolant circulation space is located on the shell side of the phosgene synthesis reactor (the space surrounding the tubes in the phosgene synthesis reactor). The tube in the phosgene synthesis reactor may have a diameter of 25 mm to 70 mm, preferably 30 mm to 50 mm and a length of 2500 mm to 7000 mm, preferably 3500 mm to 6000 mm.

In some specific embodiments, carbon monoxide and chlorine gas are fully mixed in a mixed gas in advance and then enter the phosgene synthesis reactor from the bottom. The mixed mode of carbon monoxide and chlorine gas may be a pipeline mixing, a nozzle mixing, a stirring mixing, a static mixer mixing or the like, preferably the stirring mixing and the static mixer mixing, more preferably the static mixer mixing. A molar ratio of chlorine gas to carbon monoxide may be 0.8 to 1.0, preferably 0.85 to 0.98, more preferably 0.90 to 0.95.

In another aspect, the present disclosure further provides a system for phosgene preparation and comprehensive utilization of energy, including:

a phosgene preparation unit including a phosgene synthesis reactor for making chlorine gas and carbon monoxide contact with the preceding catalyst and react under the action of the catalyst to synthesize phosgene; where the phosgene synthesis reactor is provided with a coolant circulation space for a coolant for absorbing heat of reaction generated during synthesis of the phosgene to circulate;

a steam generation unit including a steam generator communicating with the coolant circulation space for receiving the coolant that has absorbed the heat of reaction and making the coolant exchange heat with water to be converted into steam to generate steam; where the coolant circulation space in the phosgene synthesis reactor is further used for receiving the coolant that has exchanged heat with the water to be converted into the steam, that is, the coolant circulates between the coolant circulation space in the phosgene synthesis reactor and the steam generator; and a brine evaporation and concentration unit connected to the steam generation unit for receiving the steam generated by the steam generation unit and configured to evaporate and concentrate brine into concentrated brine with the steam as a heat source.

In some preferred embodiments, the system further includes an electrolysis unit, where the electrolysis unit includes a chloralkali electrolysis cell for receiving the concentrated brine or a dry salt generated through crystallization of the concentrated brine and electrolyzing the concentrated brine or the dry salt to obtain chlorine gas. In some embodiments, the concentrated brine is crystallized into the dry salt and then enters the chloralkali electrolysis cell to be electrolyzed.

In some embodiments, the phosgene preparation unit further includes a phosgene synthesis protector connected to a phosgene outlet of the phosgene synthesis reactor for receiving the phosgene outputted from the phosgene outlet and causing unreacted chlorine gas and carbon monoxide to be further reacted.

In some specific embodiments, the phosgene preparation unit further includes a mixer communicating with the phosgene synthesis reactor for mixing chlorine gas and carbon monoxide to obtain the mixed gas to be supplied to the phosgene synthesis reactor.

In some specific embodiments, the steam generation unit further includes a steam drum and a boiler water delivery pipe, where a steam inlet of the steam drum communicates with a steam outlet of the steam generator, a condensed water outlet of the steam drum communicates with a water inlet of the steam generator, and the water inlet of the steam generator further communicates with the boiler water delivery pipe; and condensed water and boiler water enter the steam generator as the water to be converted into the steam to exchange heat with the coolant from the phosgene synthesis reactor. Specifically, a steam outlet of the steam drum is connected to the brine evaporation and concentration unit to supply the steam to the brine evaporation and concentration unit as the heat source.

The system for phosgene preparation and comprehensive utilization of energy mentioned here is particularly suitable for implementing the preceding method for phosgene preparation and comprehensive utilization of energy. Preferred features mentioned in the preceding method for phosgene preparation and comprehensive utilization of energy are also applicable to the system for phosgene preparation and comprehensive utilization of energy and are not repeated here.

The technical solutions provided by the present disclosure have the beneficial effects below.

The preparation method of the present disclosure can improve the high temperature resistance and oxidation resistance of the activated carbon, and the prepared catalyst has the characteristics of high mechanical strength, good thermal conductivity, resistance to pulverization, high temperature resistance and strong oxidation resistance.

The new modified activated carbon catalyst provided by the present disclosure has strong oxidation resistance, greatly reduces the reaction rate of the activated carbon with chlorine gas and trace oxygen in the raw material gas at a high temperature, and helps reduce a content of carbon tetrachloride in the phosgene at the outlet of the phosgene synthesis protector (for example, lower than 50 mg/Nm$^3$), improving the quality of phosgene. When the catalyst is applied to phosgene preparation, the oxygen content in the raw materials chlorine gas and carbon monoxide is preferably controlled to be 10-20 mg/Nm$^3$, which can greatly reduce the reaction rate of the catalyst with the raw material chlorine gas and trace oxygen in the raw material gas, significantly alleviate or eliminate the ablation or pulverization of activated carbon at the high temperature, and improve the service life of the catalyst and the safe and stable operation of the device. Therefore, high-quality phosgene with low free chlorine and low carbon tetrachloride is produced.

The present disclosure couples a phosgene production technique based on the catalyst of the present disclosure with steam evaporation and the brine evaporation and concentration technique. Due to excellent characteristics of the catalyst of the present disclosure, a long-term operation can be implemented so that the heat of reaction generated during phosgene production can be used for stably producing steam as the by-product; then the steam can be supplied to the brine evaporation and concentration technique as the heat source so that the waste brine is evaporated and concentrated and the obtained concentrated brine can be crystallized into the dry salt or directly electrolyzed so that chlorine gas is produced. Therefore, the present disclosure can recycle the heat of reaction during phosgene synthesis, solve the problem of energy waste and resource waste due to the discharge of waste brine, and achieve the purpose of integrating comprehensive utilization of energy.

BRIEF DESCRIPTION OF DRAWINGS

In FIG. 1, 1 chlorine gas feed pipeline; 2 carbon monoxide feed pipeline; 3 mixer; 4 phosgene synthesis reactor; 5 steam generator; 6 steam drum; 7 phosgene synthesis protector; 8 coolant input pipeline; 9 boiler water delivery pipe; 10 phosgene output pipeline; 11 primary brine evaporator; 12 primary brine flash evaporator; 13 primary brine pump; 14 waste brine input pipeline; 15 secondary brine evaporator; 16 secondary brine flash evaporator; 17 secondary brine pump; 18 tertiary brine evaporator; 19 tertiary brine flash evaporator; 20 tertiary brine pump; 21 condenser; 22 vacuum pump inlet gas pipeline; 23 crystallizer; 24 dry salt output pipeline; 25-29 pipeline; 30 coolant circulation space; 31 tube.

DETAILED DESCRIPTION

Figure 1:
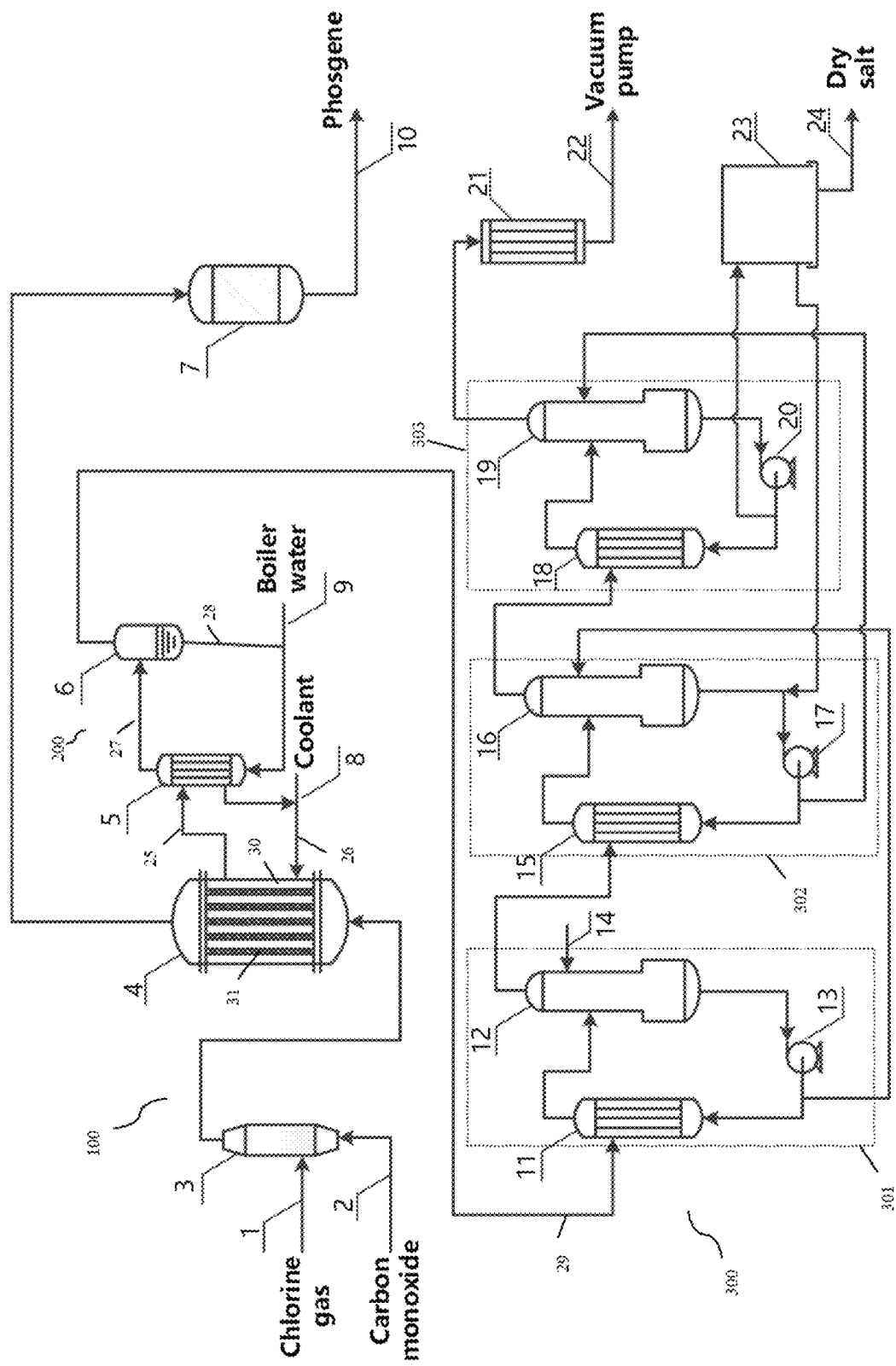
FIG. 1 is a flowchart of a technique for phosgene preparation and comprehensive utilization of energy in an embodiment.

For a better understanding of technical solutions of the present disclosure, the content of the present disclosure is further described below in conjunction with examples. However, the content of the present disclosure is not limited to the examples set forth below. Unless otherwise specified, test methods used in the following examples are all conventional methods mastered by those skilled in the art. Unless otherwise specified, devices and reagents involved herein are all conventional devices and reagents in the art.

Main raw materials involved in examples and comparative examples are sourced as follows:

carbon monoxide: produced by a gas generator in Ningbo Wanhua Industrial Park, industrial product;
chlorine gas: produced in a chlorine-hydrogen workshop of Wanhua Chemical Ningbo Chlor-Alkali Co. Ltd., industrial product;
coconut shell activated carbon: produced by Japan Tsunami Co., Ltd., industrial product;
wooden activated carbon: produced by Fujian Xinsen Carbon Industry Co., Ltd., industrial product.

Detection Method of the Content of Free Chlorine in Phosgene:
(1) Detection Principle:

$$Cl_2 + 2KI \rightarrow 2KCl + I_2$$

$$I_2 + 2Na_2S_2O_3 \rightarrow 2NaI + Na_2S_4O_6$$

(2) Detection Process:
An enough KI solution is configured, a phosgene sampling bottle is frozen and connected to a glass funnel added with the KI solution, a connection valve therebetween is turned on so that free chlorine in the phosgene is fully absorbed by the KI solution. Then, the KI solution is titrated with a prepared standard solution of $Na_2S_2O_3$ until the KI solution turns from purple to colorless.

(3) Calculation Method of Free Chlorine in the Phosgene $$Cl = \frac{V_1 \times C \times 35.5 \times 1000}{V_2}$$

wherein Cl denotes the content of free chlorine in the phosgene and has a unit of $mg/Nm^3$;
$V_1$ denotes a volume of the standard solution of $Na_2S_2O_3$ consumed through titration and has a unit of mL;
$V_2$ denotes a volume of the phosgene sampling bottle and has a unit of L; and
C denotes an actual concentration of the standard solution of $Na_2S_2O_3$ and has a unit of mol/L.

Detection Method of the Content of Carbon Tetrachloride in the Phosgene:
The content of carbon tetrachloride in the phosgene is detected on line by a gas chromatograph whose model is Hewlett Packard HP5890, a chromatographic column is Restak™ RTX-1 Crossbond 100% dimethyl polysiloxane, and the temperature rise condition of the gas chromatograph is maintained at 50° C. for 10 min, followed by a temperature rise to to 200° C. at a rate of 15° C./min.

Test of the weight loss performance of a catalyst in an air atmosphere

The weight loss performance of the catalyst in the air atmosphere is tested by a thermogravimetric analyzer whose model is Mettler Toledo TGA-2. A weight loss of unmodified activated carbon and a weight loss of modified activated carbon in the air atmosphere are tested. Operating conditions are a temperature rise rate of 20° C./min, a starting temperature of 30° C., and an ending temperature of 600° C. A balance chamber is filled with a protective gas (nitrogen) for protecting a balance. The protective gas has a flowrate of 20 mL/min, and a carrier gas (air) provided to the catalyst has a flowrate of 50 mL/min.

EXAMPLE 1

Preparation of a New Modified Activated Carbon Catalyst 100 kg of phosphoric acid at an industrial grade was accurately weighed, slowly dissolved in 1 ton of water, stirred to be dissolved completely, slowly added with 28.6 kg of silicic acid at the industrial grade, and stirred uniformly so that a modified solution was obtained.

1 ton of coconut shell activated carbon with a particle size of 3 mm was weighed and soaked in the modified solution for 10 h while stirred at a controlled rate of 30 r/min. After soaking, the solution was slowly added with 44 kg of dimethyltin dichloride powder (0.2 mol/L) and 30.4 kg of chromium oxide powder (0.2 mol/L) and reacted for 2 h. Then, the solution was added with 15 kg of nickel oxide fine powder (0.2 mol/L) with a particle size of 0.5 μm and heat-treated at 450° C. for 2 h, reacted for 2 h, and subjected to ultrasonic oscillation from the outside using an ultrasonic pulse whose frequency was controlled to be 15 kHz and width was 150 ms, where the ultrasonic oscillation was conducted for the same time as the added nickel oxide fine powder was reacted. Pre-modified activated carbon was prepared.

Then, the pre-modified activated carbon was taken out, dried in an oven at 150° C. for 4 h, and then heated and calcined in a high temperature furnace at 600° C. for 8 h. The high temperature furnace was protected by pure nitrogen so that the new modified activated carbon catalyst was prepared.

EXAMPLE 2

150 kg of phosphoric acid at an industrial grade was accurately weighed, slowly dissolved in 1 ton of water, stirred to be dissolved completely, slowly added with 75 kg of silicic acid at the industrial grade, and stirred uniformly so that a modified solution was obtained.

1 ton of coconut shell activated carbon with a particle size of 5 mm was weighed and soaked in the modified solution for 15 h while stirred at a controlled rate of 40 r/min. After soaking, the solution was slowly added with 440 kg of dimethyltin dichloride powder (2.0 mol/L) and 456 kg of chromium oxide powder (3.0 mol/L) and reacted for 3 h. Then, the solution was added with 112.5 kg of nickel oxide fine powder (1.2 mol/L) with a particle size of 0.8 μm and heat-treated at 500° C. for 3 h, reacted for 3 h, and subjected to ultrasonic oscillation from the outside using an ultrasonic pulse whose frequency was controlled to be 20 kHz and width was 300 ms, where the ultrasonic oscillation was conducted for the same time as the added nickel oxide fine powder was reacted. Pre-modified activated carbon was prepared.

Then, the pre-modified activated carbon was taken out, dried in an oven at 150° C. for 8 h, and then heated and calcined in a high temperature furnace at 700° C. for 12 h. The high temperature furnace was protected by pure nitrogen so that the new modified activated carbon catalyst was prepared.

EXAMPLE 3

125 kg of phosphoric acid at an industrial grade was accurately weighed, slowly dissolved in 1 ton of water, stirred to be dissolved completely, slowly added with 45 kg of silicic acid at the industrial grade, and stirred uniformly so that a modified solution was obtained.

1 ton of coconut shell activated carbon with a particle size of 4 mm was weighed and soaked in the modified solution for 12 h while stirred at a controlled rate of 35 r/min. After soaking, the solution was slowly added with 165 kg of dimethyltin dichloride powder (0.75 mol/L) and 180 kg of chromium oxide powder (1.2 mol/L) and reacted for 2.5 h.

Then, the solution was added with 67.5 kg of nickel oxide fine powder (0.9 mol/L) with a particle size of 0.65 μm and heat-treated at 500° C. for 2.5 h, reacted for 2.5 h, and subjected to ultrasonic oscillation from the outside using an ultrasonic pulse whose frequency was controlled to be 17.5 kHz and width was 220 ms, where the ultrasonic oscillation was conducted for the same time as the added nickel oxide fine powder was reacted. Pre-modified activated carbon was prepared.

Then, the pre-modified activated carbon was taken out, dried in an oven at 150° C. for 6 h, and then heated and calcined in a high temperature furnace at 650° C. for 10 h. The high temperature furnace was protected by pure nitrogen so that the new modified activated carbon catalyst was prepared.

EXAMPLE 4

125 kg of phosphoric acid at an industrial grade was accurately weighed, slowly dissolved in 1 ton of water, stirred to be dissolved completely, slowly added with 45 kg of silicic acid at the industrial grade, and stirred uniformly so that a modified solution was obtained.

1 ton of wooden activated carbon with a particle size of 4 mm was weighed and soaked in the modified solution for 12 h while stirred at a controlled rate of 35 r/min. After soaking, the solution was slowly added with 165 kg of dimethyltin dichloride powder (0.75 mol/L) and 180 kg of chromium oxide powder (1.2 mol/L) and reacted for 2.5 h. Then, the solution was added with 67.5 kg of nickel oxide fine powder (0.9 mol/L) with a particle size of 0.65 μm and heat-treated at 500° C. for 2.5 h, reacted for 2.5 h, and subjected to ultrasonic oscillation from the outside using an ultrasonic pulse whose frequency was controlled to be 17.5 kHz and width was 220 ms, where the ultrasonic oscillation was conducted for the same time as the added nickel oxide fine powder was reacted. Pre-modified activated carbon was prepared.

Then, the pre-modified activated carbon was taken out, dried in an oven at 150° C. for 6 h, and then heated and calcined in a high temperature furnace at 650° C. for 10 h. The high temperature furnace was protected by pure nitrogen so that the new modified activated carbon catalyst was prepared.

Examples 1 to 4 were prepared repeatedly for 5 times to ensure that the weight of the prepared new modified activated carbon catalyst was 5 ton.

EXAMPLE 5

Figure 2:
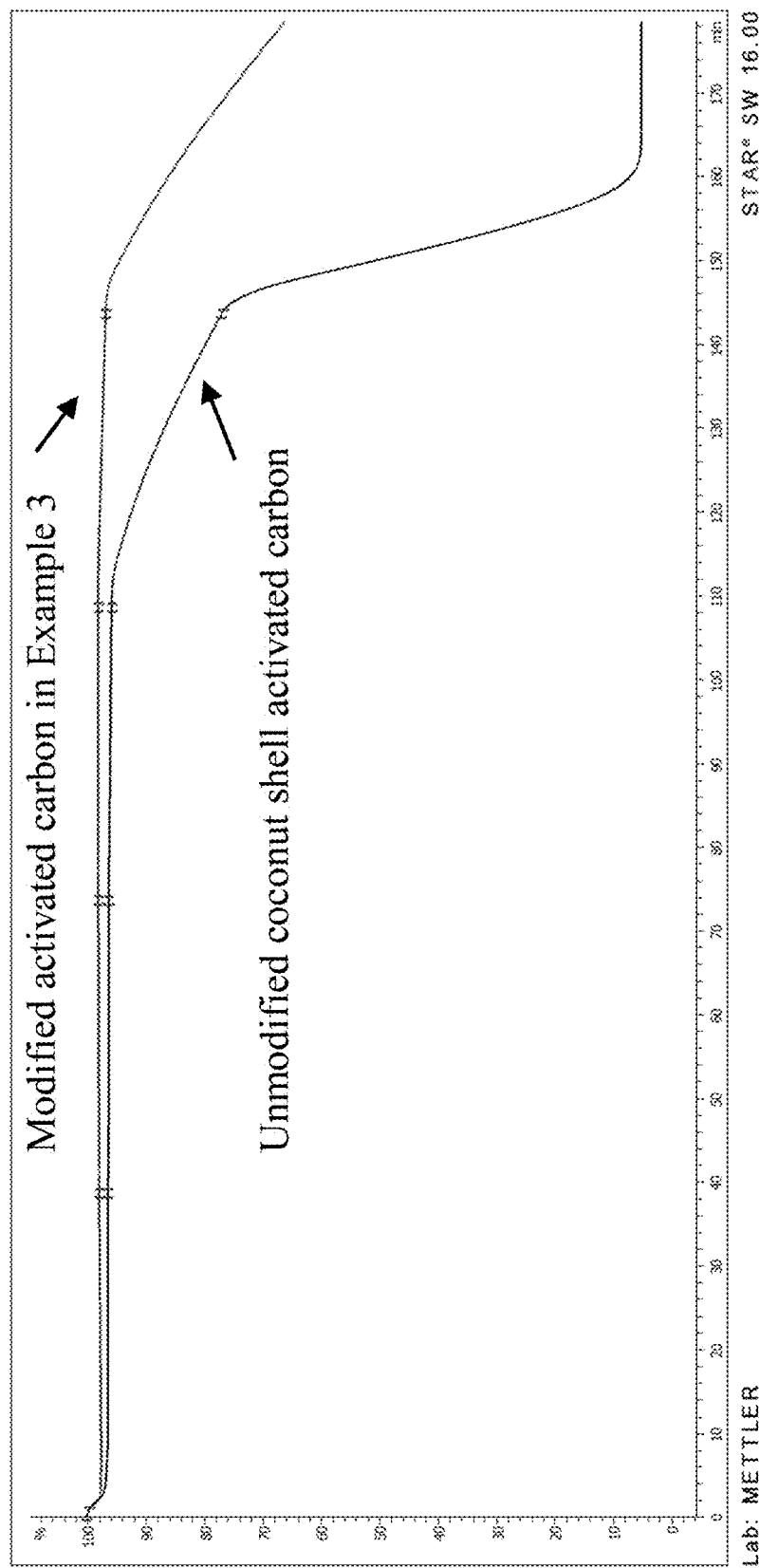
FIG. 2 shows thermogravimetric characterization results in Example 5 (in an air atmosphere)

The new modified activated carbon catalyst prepared in Example 3 and unmodified coconut shell activated carbon with a particle size of 4 mm were subjected to thermogravimetric characterization to test weight loss performance in an air atmosphere. The operating conditions of a thermogravimetric analyzer were a temperature rise rate of 20° C./min, a starting temperature of 30° C., and an ending temperature of 600° C. A balance chamber was filled with a protective gas (nitrogen) for protecting a balance at a flowrate of 20 mL/min, and a carrier gas (air) was provided to the catalyst at a flowrate of 50 mL/min. The thermogravimetric weight loss spectra of the new modified activated carbon catalyst prepared in Example 3 and the unmodified coconut shell activated carbon with a particle size of 4 mm are shown in FIG. 2. Thermogravimetric heating programs are listed below.

| Stage | Starting Temperature (° C.) | Ending Temperature (° C.) | Temperature Rise Rate (° C./min) | Time (min) |
|---|---|---|---|---|
| 1 | 30 | 200 | 20 | 8.5 |
| 2 | 200 | 200 | — | 30 |
| 3 | 200 | 400 | 20 | 10 |
| 4 | 400 | 400 | — | 30 |
| 5 | 400 | 500 | 20 | 5 |
| 6 | 500 | 500 | — | 30 |
| 7 | 500 | 550 | 20 | 2.5 |
| 8 | 550 | 550 | — | 30 |
| 9 | 550 | 600 | 20 | 2.5 |
| 10 | 600 | 600 | — | 30 |

As can be seen from FIG. 2, in the air atmosphere, the unmodified coconut shell activated carbon with a particle size of 4 mm exhibits a significant weight loss at 450° C. and a sharp weight loss increase at 520° C., and the new modified activated carbon prepared in Example 3 exhibits a significant weight loss at 550° C. and has obviously stronger high temperature resistance and oxidation resistance than unmodified activated carbon. The new modified activated carbon in Examples 1, 2 and 4 also exhibits a similar result as that in Example 3 when subjected to thermogravimetric characterization.

EXAMPLE 6

The new modified activated carbon catalyst prepared in Example 3 and the unmodified coconut shell activated carbon with a particle size of 4 mm were subjected to SEM characterization so that the morphology, thickness and continuity of a film on the surface of activated carbon were tested for each of the new modified activated carbon catalyst prepared in Example 3 and the unmodified coconut shell activated carbon. TM-1000 scanning electron microscope from Hitachi was used in the test. The SEM images of the new modified activated carbon catalyst prepared in Example 3 and the unmodified coconut shell activated carbon are shown in FIG. 3 and FIG. 4, respectively.

Figure 3:
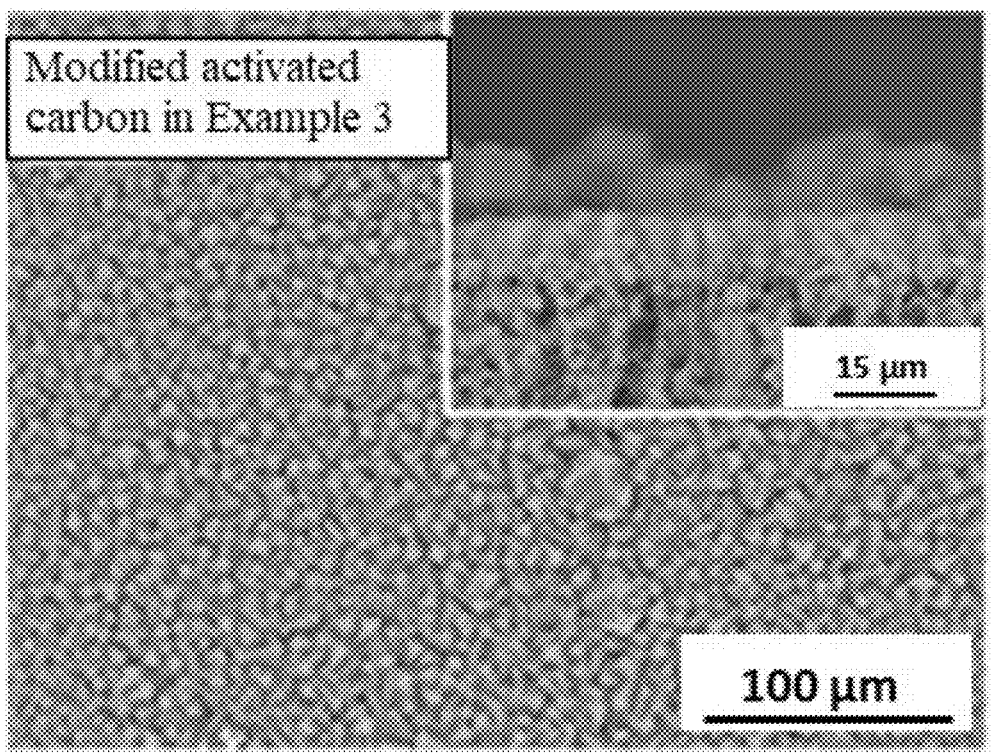
FIGS. 3 and 4 show SEM characterization results of modified activated carbon in Example 3 and unmodified coconut shell activated carbon, respectively.
Figure 4:
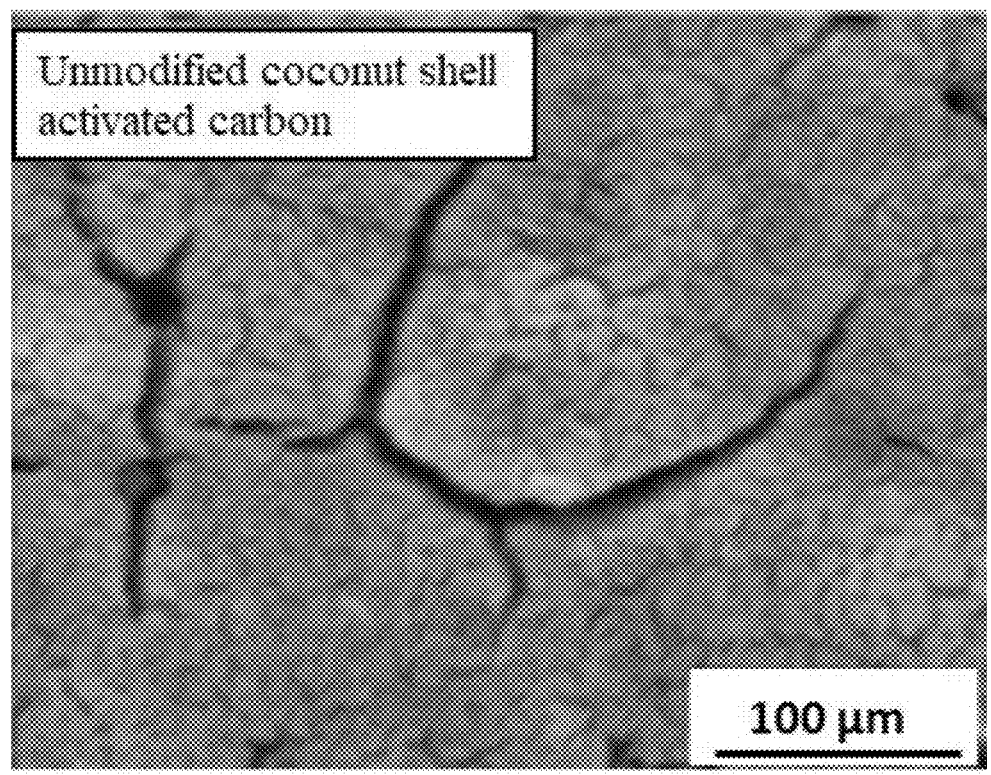

As can be seen from FIG. 3, a dense continuous thin layer with a thickness of about 7 μm covers the surface of the new modified activated carbon catalyst prepared in Example 3. However, in FIG. 4, such a feature does not exist on the surface of the unmodified coconut shell activated carbon with a particle size of 4 mm and there are obvious cracks on the surface of activated carbon. The new modified activated carbon in Examples 1, 2 and 4 also exhibits a similar result as that in Example 3 when subjected to SEM characterization.

EXAMPLE 7

The new modified activated carbon catalyst prepared in Example 3 and the unmodified coconut shell activated carbon with a particle size of 4 mm were subjected to XRD characterization. An X-ray diffractometer was D/MAX2200 from Rigaku Co., Ltd. and diffraction conditions were Cu Kα, a wavelength of 0.1541 nm, a voltage of 40 kV, a scanning speed of $3.5° \cdot min^{-1}$ and a current of 40 mA. The XRD spectra of the unmodified coconut shell activated carbon with a particle size of 4 mm and the new modified activated carbon catalyst prepared in Example 3 are separately shown in FIG. 5.

Figure 5:
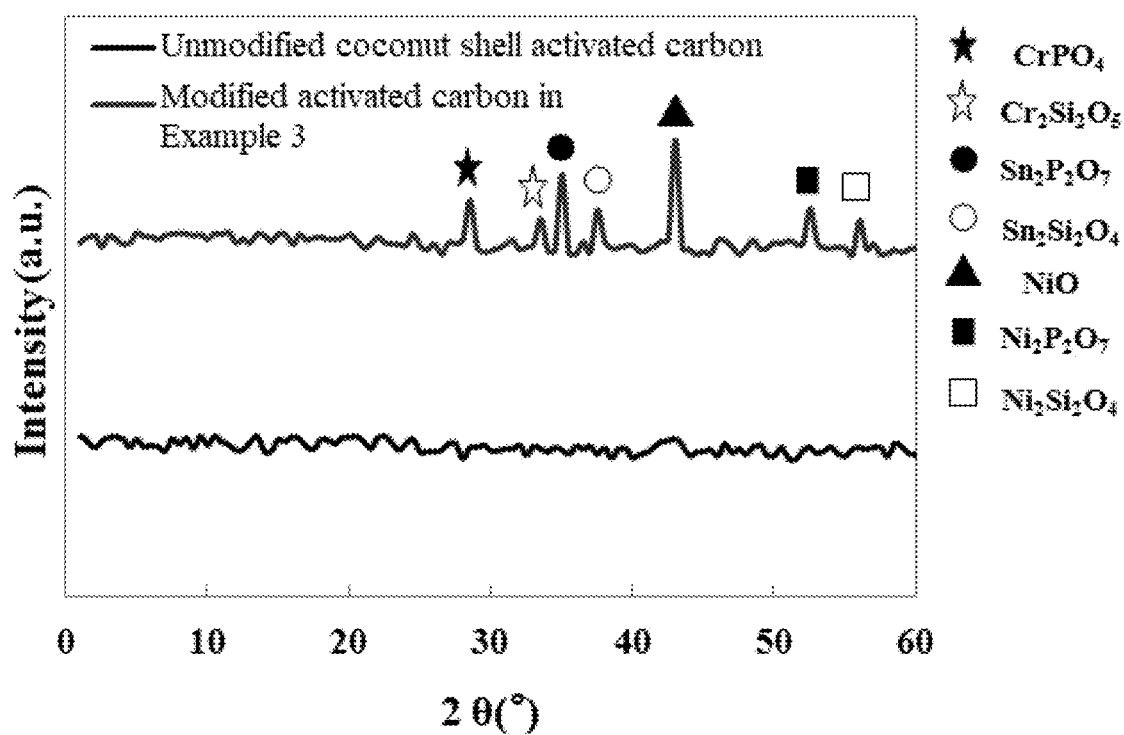
FIG. 5 shows XRD spectra of modified activated carbon in Example 3 and unmodified coconut shell activated carbon.

As can be seen from FIG. 5, compared with the unmodified coconut shell activated carbon, the new modified activated carbon catalyst prepared in Example 3 exhibits a relatively obvious characteristic diffraction peak of NiO at 2θ of 43°, a characteristic diffraction peak of $CrPO_4$ at 2θ of 28.5°, a characteristic diffraction peak of $Sn_2P_2O_7$ at 2θ of 35°, characteristic diffraction peaks of $Cr_2SiO_5$ and $Sn_2SiO_4$ at 2θ of 33.5° and 37.5°, a characteristic diffraction peak of $Ni_2P_2O_7$ at 2θ of 52.5°, and a characteristic diffraction peak of $Ni_2SiO_4$ at 2θ of 56°. The new modified activated carbon in Examples 1, 2 and 4 also exhibits a similar result as that in Example 3 when subjected to XRD characterization.

Examples of phosgene preparation and comprehensive utilization of energy are described below. A system for phosgene preparation and comprehensive utilization of energy used in the following examples is introduced below.

Referring to FIG. 1, the system mainly includes a phosgene preparation unit 100, a steam generation unit 200 and a brine evaporation and concentration unit 300.

The phosgene preparation unit 100 includes a mixer 3, a phosgene synthesis reactor 4 and a phosgene synthesis protector 7. The mixer 3 is connected to a chlorine gas feed pipeline 1 and a carbon monoxide feed pipeline 2 and configured to mix the raw material chlorine gas and the raw material carbon monoxide. The mixed mode of carbon monoxide and chlorine gas may be a pipeline mixing, a nozzle mixing, a stirring mixing, a static mixer mixing or the like. The mixer 3 communicates with the phosgene synthesis reactor 4 to input a mixed gas of chlorine gas and carbon monoxide into the phosgene synthesis reactor 4. The phosgene synthesis reactor 4 may be a tubular reactor, a spiral tube reactor, a tubular fixed bed reactor or a double-tube plate-type fixed bed reactor. The tubular fixed bed reactor is specifically used in the following examples. A tube in the phosgene synthesis reactor may have a diameter of 25 mm to 70 mm, preferably 30 mm to 50 mm and a length of 2500 mm to 7000 mm, preferably 3500 mm to 6000 mm.

The phosgene synthesis protector 7 communicates with a phosgene outlet of the phosgene synthesis reactor 4 and is configured to receive phosgene outputted from the phosgene outlet of the phosgene synthesis reactor and cause unreacted chlorine gas and carbon monoxide therein to be further reacted.

The mixed gas outputted from the mixer 3 enters the phosgene synthesis reactor 4 from its bottom. Tubes 31 in the phosgene synthesis reactor 4 are filled with a catalyst. A coolant circulation space 30 (that is, a shell side) of the phosgene synthesis reactor 4 is used for a coolant to circulate, where the coolant is used for absorbing heat of reaction generated in a phosgene synthesis process. The coolant may be one or at least two of chlorobenzene, o-dichlorobenzene, carbon tetrachloride, decalin or an alkylbenzene type heat transfer oil, preferably one or at least two of o-dichlorobenzene, xylene, carbon tetrachloride or decalin, more preferably o-dichlorobenzene or decalin, further more preferably decalin.

The steam generation unit 200 includes a steam generator 5 and a steam drum 6, where a coolant inlet (not shown in the figure) of the steam generator 5 communicates with a coolant outlet (not shown in the figure) on the shell side of the phosgene synthesis reactor 4 through a pipeline 25, and a coolant outlet (not shown in the figure) of the steam generator 5 communicates with a coolant inlet (not shown in the figure) on the shell side of the phosgene synthesis reactor 4 through a pipeline 26. The coolant inlet on the shell side of the phosgene synthesis reactor 4 also communicates with a coolant input pipeline 8 for supplying the coolant. A steam inlet (not shown in the figure) of the steam drum 6 communicates with a steam outlet (not shown in the figure) of the steam generator 5 through a pipeline 27, and a condensed water outlet (not shown in the figure) of the steam drum 6 communicates with a water inlet (not shown in the figure) of the steam generator 5 through a pipeline 28; the water inlet of the steam generator 5 also communicates with a boiler water delivery pipe 9. The coolant that has absorbed the heat of reaction in the phosgene synthesis reactor 4 is introduced into the steam generator 5 through the pipeline 25 and exchanges heat with condensed water from the steam drum 6/boiler water from the boiler water delivery pipe 9 so that steam is generated. The cooled coolant after heat exchange circulates into the phosgene synthesis reactor 4 through the pipeline 26. Specifically, the coolant outlet on the shell side of the phosgene synthesis reactor 4 is located on an upper part, the coolant inlet on the shell side of the phosgene synthesis reactor 4 is located on a lower part, and the upper part of the shell side of the reactor is provided with a vapor phase evaporation space. The coolant removes the heat of reaction by taking away latent heat of vaporization and enters the steam generator 5 for heat exchange after vaporized.

The brine evaporation and concentration unit 300 is connected to the steam generation unit 200 for receiving the steam generated by the steam generation unit and configured to evaporate and concentrate brine into concentrated brine with the steam as a heat source. Specifically, the brine evaporation and concentration unit 300 adopts double-effect or multi-effect evaporation well-known to those skilled in the art, preferably double-effect or triple-effect evaporation. A specific evaporation technique or a device on which the evaporation technique is based are both well-known to those skilled in the art. In the following examples, triple-effect evaporation is used. For details, see FIG. 1. The following is an example description with reference to FIG. 1. The brine evaporation and concentration unit 300 specifically includes a primary concentration unit 301, a secondary concentration unit 302 and a tertiary concentration unit 303 in series. Each concentration unit includes a brine evaporator (11, 15 or 18), a brine flash evaporator (12, 16 or 19) and a brine pump (13, 17 or 20). The steam in the steam drum 6 is sent to a primary brine evaporator 11 of the primary concentration unit 301 through a pipeline 29, and waste brine entering a primary brine flash evaporator 12 through a waste brine input pipeline 14 is sent to the primary brine evaporator 11 through a primary brine pump 13, exchanges heat with the steam from the steam drum 6, and then enters the primary brine flash evaporator 12 for flash evaporation and concentration. Under the action of the pump 13, a primary concentrated brine obtained through flash evaporation and concentration is sent to a secondary brine flash evaporator 16 of the secondary concentration unit 302 and subjected to the same specific treatment in the secondary concentration unit 302 as in the primary concentration unit 301. After flash evaporation and concentration in the secondary concentration unit 302, the concentrated brine enters the tertiary concentration unit 303 for the same flash evaporation and concentration as in the primary concentration unit 301 and the secondary concentration unit 302. Steam in the primary brine flash evaporator 12 of the primary concentration unit 301 flows into a secondary brine evaporator 15 of the secondary concentration unit 302 to exchange heat with brine. Similarly, steam in the secondary brine flash evaporator 16 of the secondary concentration unit 302 flows into a tertiary brine evaporator 18 of the tertiary concentration unit 303 to exchange heat with brine. Steam discharged from a tertiary brine flash evaporator 19 enters a condenser 21 to be condensed. Concentrated brine obtained through flash evaporation and concentration in the tertiary concentration unit 303 may further enters a crystallizer 23 to be crystallized for obtaining a dry salt. Alternatively, the concentration of sodium chloride in the obtained concentrated brine is controlled to be 300 g/L to 310 g/L and the concentrated brine may be directly sent to a chloralkali electrolysis cell downstream and electrolyzed so that chlorine gas is produced.

EXAMPLE 8

The new modified activated carbon catalyst prepared in Example 1 was filled in a phosgene synthesis reactor and a phosgene synthesis protector. A tube in the reactor had a diameter of 40 mm and a length of 5000 mm. The phosgene synthesis reactor was filled with 4.8 t of catalyst in total. A total oxygen content in chlorine gas and carbon monoxide was 15 mg/Nm$^3$. Chlorine gas and carbon monoxide were mixed in a static mixer at a molar ratio of 0.93 and reacted in the phosgene synthesis reactor so that phosgene was generated. The pressure of the phosgene synthesis reactor was controlled to be 0.4 MPaG, an inlet temperature of the phosgene synthesis reactor was 30° C., the temperature at the phosgene outlet of the phosgene synthesis reactor was controlled to be 210° C., and tubes in the phosgene synthesis reactor were provided with thermocouples to monitor a hot spot temperature. The phosgene at the outlet of the phosgene synthesis reactor entered the phosgene synthesis protector, and unreacted chlorine gas and carbon monoxide therein were further reacted completely. The pressure of the phosgene synthesis protector was controlled to be 0.4 MPaG, and an outlet temperature of the phosgene synthesis protector was controlled to be 65° C. A coolant on the shell side of the phosgene synthesis reactor was decalin. Decalin was vaporized on the shell side and entered a steam generator to exchange heat with boiler water (and condensed water from a steam drum). The by-product steam with a pressure of 1.0 MPaG and a flowrate of 21 t/h was used for triple-effect evaporation of waste brine. The waste brine was specifically waste brine produced in a production process of diphenylmethane diamine/polyphenylmethane polyamine or diphenylmethane diisocyanate/polyphenylmethane polyisocyanate, where sodium chloride in the waste brine had a mass concentration of 15% and TOC therein had a content of 10 ppm. After the waste brine was concentrated, sodium chloride had a concentration of 309 g/L. The concentrated brine was sent to a chloralkali electrolysis cell and electrolyzed so that chlorine gas was produced, achieving the comprehensive utilization of energy and three wastes. The analysis results of free chlorine and carbon tetrachloride in the phosgene at the outlet of the phosgene synthesis protector are shown in Table 1.

EXAMPLES 9 TO 11

The phosgene preparation method was performed under the same conditions in Examples 9 to 11 as in Example 8 except that for the new modified activated carbon catalyst filled in the phosgene synthesis reactor, activated carbon catalysts used in Examples 9, 10 and 11 corresponded to Examples 2, 3 and 4, respectively. The specific analysis results are shown in Table 1.

EXAMPLE 12

The new modified activated carbon catalyst prepared in Example 3 was filled in a phosgene synthesis reactor and a phosgene synthesis protector. A tube in the reactor had a diameter of 40 mm and a length of 5000 mm. The phosgene synthesis reactor was filled with 4.8 t of catalyst in total. A total oxygen content in chlorine gas and carbon monoxide was 50 mg/Nm$^3$. Chlorine gas and carbon monoxide were mixed in a static mixer at a molar ratio of 0.93 and reacted in the phosgene synthesis reactor so that phosgene was generated. The pressure of the phosgene synthesis reactor was controlled to be 0.4 MPaG, an inlet temperature of the phosgene synthesis reactor was 30° C., the temperature at the phosgene outlet of the phosgene synthesis reactor was controlled to be 210° C., and tubes in the phosgene synthesis reactor were provided with thermocouples to monitor a hot spot temperature. The phosgene at the outlet of the phosgene synthesis reactor entered the phosgene synthesis protector, and unreacted chlorine gas and carbon monoxide therein were further reacted completely. The pressure of the phosgene synthesis protector was controlled to be 0.4 MPaG, and an outlet temperature of the phosgene synthesis protector was controlled to be 65° C. A coolant on the shell side of the phosgene synthesis reactor was decalin. Decalin was vaporized on the shell side and entered a steam generator to exchange heat with boiler water (and some condensed water from a steam drum). The by-product steam with a pressure of 1.0 MPaG and a flowrate of 21 t/h was used for triple-effect evaporation of waste brine. The waste brine was specifically waste brine produced in a production process of diphenylmethane diamine/polyphenylmethane polyamine or diphenylmethane diisocyanate/polyphenylmethane polyisocyanate, where sodium chloride in the waste brine had a mass concentration of 15% and TOC therein had a content of 10 ppm. After the waste brine was concentrated, sodium chloride had a concentration of 309 g/L. The concentrated brine was sent to a chloralkali electrolysis cell and electrolyzed so that chlorine gas was produced, achieving the comprehensive utilization of energy and three wastes. The analysis results of free chlorine and carbon tetrachloride in the synthesized phosgene at the outlet of the phosgene synthesis protector are shown in Table 1.

EXAMPLE 13

The new modified activated carbon catalyst prepared in Example 3 was filled in a phosgene synthesis reactor and a phosgene synthesis protector. A tube in the reactor had a diameter of 40 mm and a length of 5000 mm. The phosgene synthesis reactor was filled with 4.8 t of catalyst in total. A total oxygen content in chlorine gas and carbon monoxide was 15 mg/Nm$^3$. Chlorine gas and carbon monoxide were mixed in a static mixer at a molar ratio of 0.93 and reacted in the phosgene synthesis reactor so that phosgene was generated. The pressure of the phosgene synthesis reactor was controlled to be 0.4 MPaG, an inlet temperature of the phosgene synthesis reactor was 30° C., the temperature at the phosgene outlet of the phosgene synthesis reactor was controlled to be 210° C., and tubes in the phosgene synthesis reactor were provided with thermocouples to monitor a hot spot temperature. The phosgene at the outlet of the phosgene synthesis reactor entered the phosgene synthesis protector, and unreacted chlorine gas and carbon monoxide therein were further reacted completely. The pressure of the phosgene synthesis protector was controlled to be 0.4 MPaG, and an outlet temperature of the phosgene synthesis protector was controlled to be 65° C. A coolant on the shell side of the phosgene synthesis reactor was o-dichlorobenzene. O-dichlorobenzene was vaporized on the shell side and entered a steam generator to exchange heat with boiler water (and some condensed water from a steam drum). The by-product steam with a pressure of 1.0 MPaG and a flowrate of 21 t/h was used for triple-effect evaporation of waste brine. The waste brine was specifically waste brine produced in a production process of diphenylmethane diamine/polyphenylmethane polyamine or diphenylmethane diisocyanate/polyphenylmethane polyisocyanate, where sodium chloride in the waste brine had a mass concentration of 15% and TOC therein had a content of 10 ppm. After the waste brine was concentrated, sodium chloride had a concentration of 309 g/L. The concentrated brine was sent to a chloralkali electrolysis cell and electrolyzed so that chlorine gas was produced, achieving the comprehensive utilization of energy and three wastes. The analysis results of free chlorine and carbon tetrachloride in the synthesized phosgene at the outlet of the phosgene synthesis protector are shown in Table 1.

COMPARATIVE EXAMPLE 1

An unmodified coconut shell activated carbon catalyst with a particle size of 4 mm was filled in a phosgene synthesis reactor and a phosgene synthesis protector. A tube in the reactor had a diameter of 40 mm and a length of 5000 mm. The phosgene synthesis reactor was filled with 4.8 t of activated carbon in total. A total oxygen content in chlorine gas and carbon monoxide was 15 mg/Nm$^3$. Chlorine gas and carbon monoxide were mixed in a static mixer at a molar ratio of 0.93 and reacted in the phosgene synthesis reactor so that phosgene was generated. The pressure of the phosgene synthesis reactor was controlled to be 0.4 MPaG, an inlet temperature of the phosgene synthesis reactor was 30° C., the temperature at the phosgene outlet of the phosgene synthesis reactor was controlled to be 210° C., and tubes in the phosgene synthesis reactor were provided with thermocouples to monitor a hot spot temperature. The phosgene at the outlet of the phosgene synthesis reactor entered the phosgene synthesis protector, and unreacted chlorine gas and carbon monoxide therein were further reacted completely. The pressure of the phosgene synthesis protector was controlled to be 0.4 MPaG, and an outlet temperature of the phosgene synthesis protector was controlled to be 65° C. A coolant on the shell side of the phosgene synthesis reactor was decalin. Decalin was vaporized and entered a steam generator to exchange heat with boiler water (and some condensed water from a steam drum). The by-product steam with a pressure of 1.0 MPaG and a flowrate of 21 t/h was incorporated into a steam pipe network due to an unstable flowrate. Waste brine produced in a production process of diphenylmethane diamine/polyphenylmethane polyamine or diphenylmethane diisocyanate/polyphenylmethane polyisocyanate was neutralized by hydrochloric acid, where after neutralization, the pH was controlled within a range of 7 to 9 and the mass concentration of sodium chloride was controlled within a range of 15% to 23%. The waste brine was treated to be qualified and then discharged to the sea. The analysis results of free chlorine and carbon tetrachloride in the synthesized phosgene are shown in Table 1.

COMPARATIVE EXAMPLE 2

An unmodified coconut shell activated carbon catalyst with a particle size of 4 mm was filled in a phosgene synthesis reactor and a phosgene synthesis protector. A tube in the reactor had a diameter of 40 mm and a length of 5000 mm. The phosgene synthesis reactor was filled with 4.8 t of activated carbon in total. A total oxygen content in chlorine gas and carbon monoxide was 150 mg/Nm$^3$. Chlorine gas and carbon monoxide were mixed in a static mixer at a molar ratio of 0.93 and reacted in the phosgene synthesis reactor so that phosgene was generated. The pressure of the phosgene synthesis reactor was controlled to be 0.4 MPaG, an inlet temperature of the phosgene synthesis reactor was 30° C., the temperature at the phosgene outlet of the phosgene synthesis reactor was controlled to be 210° C., and tubes in the phosgene synthesis reactor were provided with thermocouples to monitor a hot spot temperature. The phosgene at the outlet of the phosgene synthesis reactor entered the phosgene synthesis protector, and unreacted chlorine gas and carbon monoxide therein were further reacted completely. An outlet temperature of the phosgene synthesis protector was controlled to be 65° C. A coolant on the shell side of the phosgene synthesis reactor was decalin. Decalin was vaporized and entered a steam generator to exchange heat with boiler water (and some condensed water from a steam drum). The by-product steam with a pressure of 1.0 MPaG and a flowrate of 21 t/h was incorporated into a steam pipe network due to an unstable flowrate. Waste brine produced in a production process of diphenylmethane diamine/polyphenylmethane polyamine or diphenylmethane diisocyanate/polyphenylmethane polyisocyanate was neutralized by hydrochloric acid, where after neutralization, the pH was controlled within a range of 7 to 9 and the mass concentration of sodium chloride was controlled within a range of 15% to 23%. The waste brine was treated to be qualified and then discharged to the sea. The analysis results of free chlorine and carbon tetrachloride in the synthesized phosgene are shown in Table 1.

TABLE 1

Performance data in examples and comparative examples

| | Total Oxygen Content in Chlorine Gas and Carbon Monoxide (mg/Nm$^3$) | Hot Spot Temperature of the Phosgene Synthesis Reactor (° C.) | Free Chlorine in Phosgene (mg/Nm$^3$) | Carbon Tetrachloride in Phosgene (mg/Nm$^3$) | Annual Loss in Mass of the Catalyst (%) | Operating Cycle (h) |
|---|---|---|---|---|---|---|
| Example 8 | 15 | 492 | 37 | 25 | 4.3 | >25000 |
| Example 9 | 15 | 471 | 26 | 11 | 3.6 | >25000 |
| Example 10 | 15 | 479 | 33 | 19 | 4.0 | >25000 |
| Example 11 | 15 | 497 | 39 | 28 | 4.6 | >25000 |
| Example 12 | 50 | 510 | 48 | 46 | 5.3 | >20000 |
| Example 13 | 15 | 485 | 37 | 22 | 4.1 | >25000 |
| Comparative Example 1 | 15 | 554 | 122 | 216 | 11.7 | <12000 |

TABLE 1-continued

Performance data in examples and comparative examples

| | Total Oxygen Content in Chlorine Gas and Carbon Monoxide (mg/Nm³) | Hot Spot Temperature of the Phosgene Synthesis Reactor (° C.) | Free Chlorine in Phosgene (mg/Nm³) | Carbon Tetrachloride in Phosgene (mg/Nm³) | Annual Loss in Mass of the Catalyst (%) | Operating Cycle (h) |
|---|---|---|---|---|---|---|
| Comparative example 2 | 150 | 579 | 145 | 289 | 18.5 | <8000 |

Note:
In Table 1, the operating cycle refers to an actual operating time.

As can be seen from the preceding test results, the modified activated carbon catalyst obtained by the method of the present disclosure has a longer service life; during phosgene preparation, the device can operate safely and stably for a longer time; and the steam generation unit is combined so that high-quality steam can be produced stably as a heat source for evaporation and concentration of waste brine, achieving comprehensive utilization of energy and avoiding resource waste. Moreover, based on the modified activated carbon catalyst obtained by the method of the present disclosure, the hot spot temperature of the phosgene synthesis reactor is relatively lower, the catalyst has a small loss, and the content of free chlorine and carbon tetrachloride in phosgene is low; when the oxygen content in the raw material gas is 10-50 mg/Nm³, especially 10-20 mg/m³, the hot spot temperature of the phosgene synthesis reactor is lower, the catalyst has a smaller loss, the operating cycle is longer, and the content of free chlorine and carbon tetrachloride in the phosgene is lower. Meanwhile, in view of the smaller loss of the modified activated carbon catalyst of the present disclosure and the longer operating cycle, the modified catalyst has stronger high temperature resistance and oxidation resistance.

Those skilled in the art will appreciate that some modifications or adaptations may be made to the present disclosure based on the teachings of the description. These modifications or adaptations should fall within the scope of the claims in the present disclosure.

What is claimed is:

1. A preparation method of a catalyst for preparing phosgene, comprising the following steps:
    (1) soaking activated carbon in a modified solution with stirring, then adding dimethyltin dichloride and chromium oxide powder to the modified solution for reaction, and adding heat-treated nickel oxide fine powder and performing ultrasonic oscillation to obtain pre-modified activated carbon, wherein the modified solution is a mixed acid solution comprising phosphoric acid and silicic acid;
    (2) drying the pre-modified activated carbon obtained in step (1); and
    (3) under the protection of an inert gas, heating and calcining the pre-modified activated carbon dried in step (2) to obtain the catalyst.

2. The preparation method according to claim 1, wherein the modified solution in step (1) is obtained in a manner that phosphoric acid is stirred and dissolved in water to obtain a phosphoric acid solution and then silicic acid is added to the phosphoric acid solution and stirred uniformly;
the phosphoric acid solution has a mass concentration of 5% to 20%;
a mass ratio of silicic acid to phosphoric acid is 1:1 to 1:5.

3. The preparation method according to claim 1, wherein the activated carbon in step (1) is selected from wooden activated carbon and/or coconut shell activated carbon and has a particle size of 2 mm to 7 mm.

4. The preparation method according to claim 1, wherein in step (1), the activated carbon is soaked in the modified solution for 5 h to 20 h;
    in step (1), the activated carbon is stirred at a rate of 20 r/min to 50 r/min;
    in step (1), a mass ratio of the activated carbon to the modified solution is 1:0.6 to 1:2.

5. The preparation method according to claim 1, wherein in step (1), dimethyltin dichloride is added in an amount of 0.2-2.0 mol/L;
    in step (1), chromium oxide is added in an amount of 0.2-3.0 mol/L;
    in step (1), a reaction time for adding the dimethyltin dichloride powder and chromium oxide powder for the reaction is 1-5 h.

6. The preparation method according to claim 1, wherein in step (1), the nickel oxide fine powder is heat-treated at a temperature of 400-600° C. for 1-4 h;
    in step (1), the nickel oxide fine powder has a particle size of 0.3-1.5 μm, and the nickel oxide fine powder is added in an amount of 0.2-1.5 mol/L.

7. The preparation method according to claim 1, wherein in step (1), the ultrasonic oscillation is conducted using an ultrasonic pulse with a frequency of 10-30 kHz and a width of 50-500 ms; the ultrasonic oscillation is conducted for 1-5 h.

8. The preparation method according to claim 1, wherein in step (2), the pre-modified activated carbon is dried at a temperature of 150-200° C. for 4 h to 8 h;
    in step (3), the pre-modified activated carbon is heated and calcined at a temperature of 500° C. to 800° C. for 5 h to 15 h.

9. A catalyst for preparing phosgene, wherein the catalyst uses activated carbon as a carrier, and a thin layer formed on a surface of the activated carbon is formed through bonding of chromium tin phosphate and chromium tin silicate to Ni with —O—Ni—O— bonds, separately;
    the catalyst is prepared by the preparation method according to claim 1.

10. A use of a catalyst prepared by the preparation method according to claim 1 for catalyzing a reaction of carbon monoxide with chlorine gas to prepare phosgene; wherein a total oxygen content in the raw material chlorine gas and the raw material carbon monoxide is controlled to be 10-50 mg/Nm$^3$.

11. A method for phosgene preparation and comprehensive utilization of energy, comprising the following steps:
chlorine gas and carbon monoxide are mixed, in a phosgene synthesis reactor filled with a catalyst prepared by the preparation method according to claim 1, and are reacted under the action of the catalyst to synthesize phosgene, wherein a reaction pressure in the phosgene synthesis reactor is 0.1-0.5 MPaG and an inlet temperature of the phosgene synthesis reactor is 10-60° C.;
the phosgene synthesis reactor is provided with a coolant circulation space, where a coolant circulating in the coolant circulation space is used for absorbing heat of reaction generated during synthesis of phosgene; the coolant in the coolant circulation space absorbs the heat of reaction, is introduced into a steam generator, and exchanges heat with water to be converted into steam so that the steam is generated; and the coolant that has exchanged heat with the water to be converted into the steam is returned to the coolant circulation space in the phosgene synthesis reactor for absorbing the heat of reaction generated during the synthesis of the phosgene; and
the steam is supplied to a brine evaporation and concentration unit for evaporating and concentrating a brine as a heat source required for evaporation and concentration of the brine;
a concentrated brine obtained through the evaporation and concentration of the brine evaporation and concentration unit is sent to a chloralkali electrolysis cell and electrolyzed so that chlorine gas is obtained.

12. The method according to claim 11, wherein a total oxygen content in the raw material chlorine gas and the raw material carbon monoxide is controlled to be 10-50 mg/Nm$^3$.

13. The method according to claim 11, wherein the coolant comprises one or at least two of chlorobenzene, o-dichlorobenzene, carbon tetrachloride, decalin or an alkylbenzene type heat transfer oil.

14. The method according to claim 11, wherein the phosgene synthesized in the phosgene synthesis reactor is sent to a phosgene synthesis protector for chlorine gas and carbon monoxide to be further reacted;
a content of free chlorine in phosgene outputted from an outlet of the phosgene synthesis protector is lower than 50 mg/Nm$^3$;
an outlet temperature of the phosgene synthesis protector is controlled to be lower than 100° C.

15. The method according to claim 11, wherein the steam generated in the steam generator has a pressure of 0.2-1.6 MPaG; and/or
the brine to be evaporated and concentrated in the brine evaporation and concentration unit is from waste brine produced in a production process of diphenylmethane diamine, polyphenylmethane polyamine, diphenylmethane diisocyanate or polyphenylmethane polyisocyanate; sodium chloride in the brine has a mass concentration of 5% to 23% and TOC in the brine has a content of 2-15 ppm; and/or
the brine evaporation and concentration unit adopts double-effect or multi-effect evaporation; and/or
a concentration of sodium chloride in the concentrated brine obtained through the evaporation and concentration of the brine evaporation and concentration unit is controlled to be 300 g/L to 310 g/L; and/or
the phosgene synthesis reactor is a tubular reaction tube, a spiral tube reactor, a fixed bed tubular reactor or a double-tube plate fixed bed reactor.

16. A system for phosgene preparation and comprehensive utilization of energy, comprising:
a phosgene preparation unit comprising a phosgene synthesis reactor for making chlorine gas and carbon monoxide contact with a catalyst prepared by the preparation method according to claim 1 and react under the action of the catalyst to synthesize phosgene; wherein the phosgene synthesis reactor is provided with a coolant circulation space for a coolant for absorbing heat of reaction generated during synthesis of the phosgene to circulate;
a steam generation unit comprising a steam generator communicating with the coolant circulation space for receiving the coolant that has absorbed the heat of reaction and making the coolant exchange heat with water to be converted into steam to generate steam; wherein the coolant circulation space in the phosgene synthesis reactor is further used for receiving the coolant that has exchanged heat with the water to be converted into the steam; and
a brine evaporation and concentration unit connected to the steam generation unit for receiving the steam generated by the steam generation unit and configured to evaporate and concentrate brine into concentrated brine with the steam as a heat source.

17. The system according to claim 16, further comprising an electrolysis unit, wherein the electrolysis unit comprises a chloralkali electrolysis cell for receiving the concentrated brine or a dry salt generated through crystallization of the concentrated brine and electrolyzing the concentrated brine or the dry salt to obtain chlorine gas.

18. The system according to claim 16, wherein the phosgene preparation unit further comprises a phosgene synthesis protector connected to a phosgene outlet of the phosgene synthesis reactor for receiving the phosgene outputted from the phosgene outlet and causing unreacted chlorine gas to further react with carbon monoxide.

* * * * *